(12) United States Patent
Shibuya (10) Patent No.: US 8,133,610 B2
(45) Date of Patent: Mar. 13, 2012

(54) BATTERY

(75) Inventor: Mashio Shibuya, Fukushima (JP)

(73) Assignee: Sony Corporation, Tokyo (JP)

( * ) Notice: Subject to any disclaimer, the term of this patent is extended or adjusted under 35 U.S.C. 154(b) by 1198 days.

(21) Appl. No.: 11/865,612

(22) Filed: Oct. 1, 2007

(65) Prior Publication Data
US 2008/0090142 A1 Apr. 17, 2008

(30) Foreign Application Priority Data
Oct. 13, 2006 (JP) .................................. 2006-280247

(51) Int. Cl.
| H01M 6/04 | (2006.01) |
| H01M 4/02 | (2006.01) |
| H01M 4/60 | (2006.01) |
| H01M 4/62 | (2006.01) |

(52) U.S. Cl. ......... 429/188; 429/212; 429/209; 429/217
(58) Field of Classification Search .................. 429/188, 429/212, 209, 217
See application file for complete search history.

(56) References Cited

U.S. PATENT DOCUMENTS

| 6,506,523 | B1 | 1/2003 | Hatazawa et al. |
| 6,509,123 | B1 | 1/2003 | Shibuya et al. |
| 6,815,124 | B2 | 11/2004 | Suzuki et al. |
| 2004/0121232 | A1 | 6/2004 | Kato |

FOREIGN PATENT DOCUMENTS

| JP | 11-130821 | 5/1999 |
| JP | 11-312536 | 11/1999 |
| JP | 2001-167797 | 6/2001 |
| JP | 2001-273895 | 10/2001 |
| JP | 2002-008723 | 1/2002 |
| JP | 2002-110249 | 4/2002 |
| JP | 2004-55493 | 2/2004 |
| JP | 2004-87325 | 3/2004 |
| JP | 2006-1142154 | 4/2006 |
| JP | 2006-156311 | 6/2006 |
| WO | 2004-049475 | 6/2004 |

*Primary Examiner* — Helen O Conley
(74) *Attorney, Agent, or Firm* — K&L Gates LLP (57) ABSTRACT

A battery capable of obtaining the superior battery performance is provided. An electrolyte is a gel electrolyte containing an electrolytic solution and a polymer compound. The polymer compound contains a ternary system copolymer containing vinylidene fluoride, hexafluoropropylene, and monomethylmaleic acid ester as a component. The copolymerization amounts of hexafluoropropylene and monomethylmaleic acid ester in the ternary system copolymer are respectively in the range from 4 wt % to 7.5 wt %, and in the range from 0.3 wt % to 2 wt %. Further, the weight average molecular weight of the ternary system copolymer is in the range from 0.6 million to 1.5 million. The liquid retaining characteristics of the electrolyte are improved. Therefore, the contact characteristics of the electrolyte to a cathode, an anode, and a separator are improved.

6 Claims, 2 Drawing Sheets

BATTERY

CROSS REFERENCES TO RELATED APPLICATIONS

The present application claims priority to Japanese Patent Application JP 2006-280247 filed in the Japanese Patent Office on Oct. 13, 2006, the entire contents of which is being incorporated herein by reference.

BACKGROUND

The present application relates to a battery including an electrolyte containing an electrolytic solution and a polymer compound.

In recent years, portable electronic devices such as a combination camera (video tape recorder), a mobile phone, and a notebook personal computer have been widely used. Downsizing, weight saving, and long life of such devices have been strongly demanded. Accordingly, as a power source of the portable electronic devices, a battery, in particular a light weight secondary battery that can provide a high energy density and a high output density has been developed.

A battery includes a cathode, an anode, and an electrolyte working as ion conduction path between the electrodes inside a metal can. In the battery, when the distance between the cathode and the anode is sufficiently large, the internal short circuit is hardly generated. However, the volume of the electrolyte that does not actually distribute to the battery life is designed small as much as possible. Thus, there is a tendency that the internal short circuit between the electrodes is easily generated. Therefore, to prevent internal short circuit even when the distance between the cathode and the anode is designed small, a separator made of a film, a nonwoven fabric, or paper is inserted between the electrodes.

As an electrolyte, a liquid electrolyte is widely used. Such a kind of electrolyte is generally called "electrolytic solution," and contains a solvent and an electrolyte salt. As the electrolytic solution, in addition to an inorganic electrolyte such as sulfuric acid aqueous solution for a lead battery and potassium hydroxide aqueous solution for a dry cell, an organic electrolyte such as propylene carbonate solution and the like are known. The electrolytic solution is an ionic liquid with the high salt concentration. An electrolytic solution may show the strong acidity or strong alkalinity, or may be a nonaqueous solution according to the specification and the purpose of the battery. Therefore, in the battery including the electrolytic solution, when the electrolytic solution is leaked, the electric circuit or the like may be corroded, or resin parts may be dissolved. Thus, to stably use the battery, it is important to prevent leakage of the electrolytic solution.

Accordingly, a method for gelating an electrolytic solution by using a polymer compound has been suggested (for example, refer to Japanese Unexamined Patent Application Publication No. 2001-167797). Such a kind of electrolyte is generally called "gel electrolyte." In the gel electrolyte, the electrolytic solution is held by a polymer compound. Therefore, the electrolytic solution is prevented from being leaked. In addition, the gel electrolyte closely contacts with and supports the cathode, the anode, and the separator and the like, and thereby the cathode, the anode, and the separator and the like have the self bearing properties. Thus, as a package member of the battery, a film package member can be used instead of a metal package member. In this case, the package member becomes light-weight, and thus the battery itself becomes light-weight. Further, complicated parts for structuring the battery are not necessitated. In the result, the battery can be manufactured at a lower cost. Furthermore, the film package member has the superior workability, and thus the degree of freedom of the battery shape is widened. Consequently, the battery including the gel electrolyte is superior not only in terms of preventing leakage of the electrolytic solution, but also in terms of attaining a light-weight battery, low manufacturing cost, and expansion of degree of freedom of the shape.

For the polymer compound used for the gel electrolyte, for the purpose of improving various performances, several polymers have been already suggested. More specifically, to favorably secure the electric connection between the cathode/the anode and the gel electrolyte, it is known that a binary system copolymer containing vinylidene fluoride and hexafluoropropylene as a component is used (for example, refer to Japanese Unexamined Patent Application Publication No. 11-312536). Further, to improve the load characteristics, the low temperature characteristics, and the cycle characteristics, it is known that a ternary system copolymer containing vinylidene fluoride, hexafluoropropylene, and monochlorotrifluoroethylene as a component, or a ternary system copolymer containing vinylidene fluoride, hexafluoropropylene, and monomethylmaleic acid ester as a component is used (for example, refer to Japanese Unexamined Patent Application Publication Nos. 2006-114254 and 2002-008723).

In addition that the polymer is used for the gel electrolyte, it has been suggested that the polymer is used for a cathode binder and an anode binder. More specifically, it is known that polyvinylidene fluoride is used (for example refer to Japanese Unexamined Patent Application Publication Nos. 2001-273895 and 2002-110249); a binary system copolymer containing vinylidene fluoride and monomethylmaleic acid ester as a component is used (for example, refer to International Publication No. WO2004/049475 and Japanese Unexamined Patent Application Publication No. 2004-55493); and a binary system copolymer containing vinylidene fluoride and chlorotrifluoroethylene as a component is used (for example, refer to Japanese Unexamined Patent Application Publication No. 2004-087325).

However, to improve the performance of the battery including the gel electrolyte, the gel electrolyte should have the sufficient liquid retaining characteristics. However, when the salt concentration of the electrolytic solution is increased to improve the battery capacity, the interaction between the solvent and the electrolyte salt becomes stronger. In the result, the interaction between the solvent and the polymer compound becomes weaker relatively, resulting in lowering of the liquid retaining characteristics of the gel electrolyte. In this case, when the electrolytic solution is released from the polymer compound, the contact characteristics between the gel electrolyte and the cathode/the anode/the separator becomes lowered. In the result, the battery performance such as the battery capacity, the cycle characteristics, and the load characteristics is lowered. Furthermore, if a defect such as a break in the film package member exists, the electrolytic solution is leaked in spite of using the gel electrolyte, resulting in lowering of the battery performance as well.

SUMMARY

In view of the foregoing, it is desirable to provide a battery capable of providing the superior battery performance by improving the liquid retaining characteristics of the electrolyte.

According to an embodiment, there is provided a battery including a cathode, an anode, and an electrolyte, wherein: (1) the electrolyte contains an electrolytic solution and a polymer compound that contains a ternary system copolymer containing vinylidene fluoride, hexafluoropropylene, and monomethylmaleic acid ester as a component, copolymerization amounts of the hexafluoropropylene and monomethylmaleic acid ester in the ternary system copolymer are respectively in a range from 4 wt % to 7.5 wt %, and in a range from 0.3 wt % to 2 wt %, and a weight average molecular weight of the ternary system copolymer is in a range from 0.6 million to 1.5 million; (2) the electrolytic solution contains a solvent and an electrolyte salt, a concentration of the electrolyte salt in the electrolytic solution is in a range from 0.8 mol/kg to 1.7 mol/kg; (3) the cathode contains a cathode active material and a cathode binder that contains a polymer containing vinylidene fluoride as a component; and (4) the anode contains an anode active material and an anode binder that contains a binary system copolymer containing vinylidene fluoride and monomethylmaleic acid ester as a component, and a copolymerization amount of the monomethylmaleic acid ester in the binary system copolymer is in a range from 0.3 wt % to 2 wt %.

According to an embodiment, (1) the polymer compound in the electrolyte contains the ternary system copolymer containing vinylidene fluoride, hexafluoropropylene, and monomethylmaleic acid ester as a component, the copolymerization amounts of the hexafluoropropylene and monomethylmaleic acid ester in the ternary system copolymer are respectively in the range from 4 wt % to 7.5 wt % and in the range from 0.3 wt % to 2 wt %, and the weight average molecular weight of the ternary system copolymer is in the range from 0.6 million to 1.5 million; (2) the concentration of the electrolyte salt in the electrolytic solution is in the range from 0.8 mol/kg to 1.7 mol/kg; (3) the cathode binder in the cathode contains the polymer containing vinylidene fluoride as a component; and (4) the anode binder in the anode contains the binary system copolymer containing vinylidene fluoride and monomethylmaleic acid ester as a component, and the copolymerization amount of the monomethylmaleic acid ester in the binary system copolymer is in the range from 0.3 wt % to 2 wt %. In this case, the liquid retaining characteristics of the electrolyte are improved. Therefore, the contact characteristics of the electrolyte to the cathode and the anode are improved. Consequently, superior battery characteristics can be obtained.

Additional features and advantages are described herein, and will be apparent from, the following Detailed Description and the figures.

DETAILED DESCRIPTION

An embodiment will be hereinafter described in detail with reference to the drawings.

Figure 1:
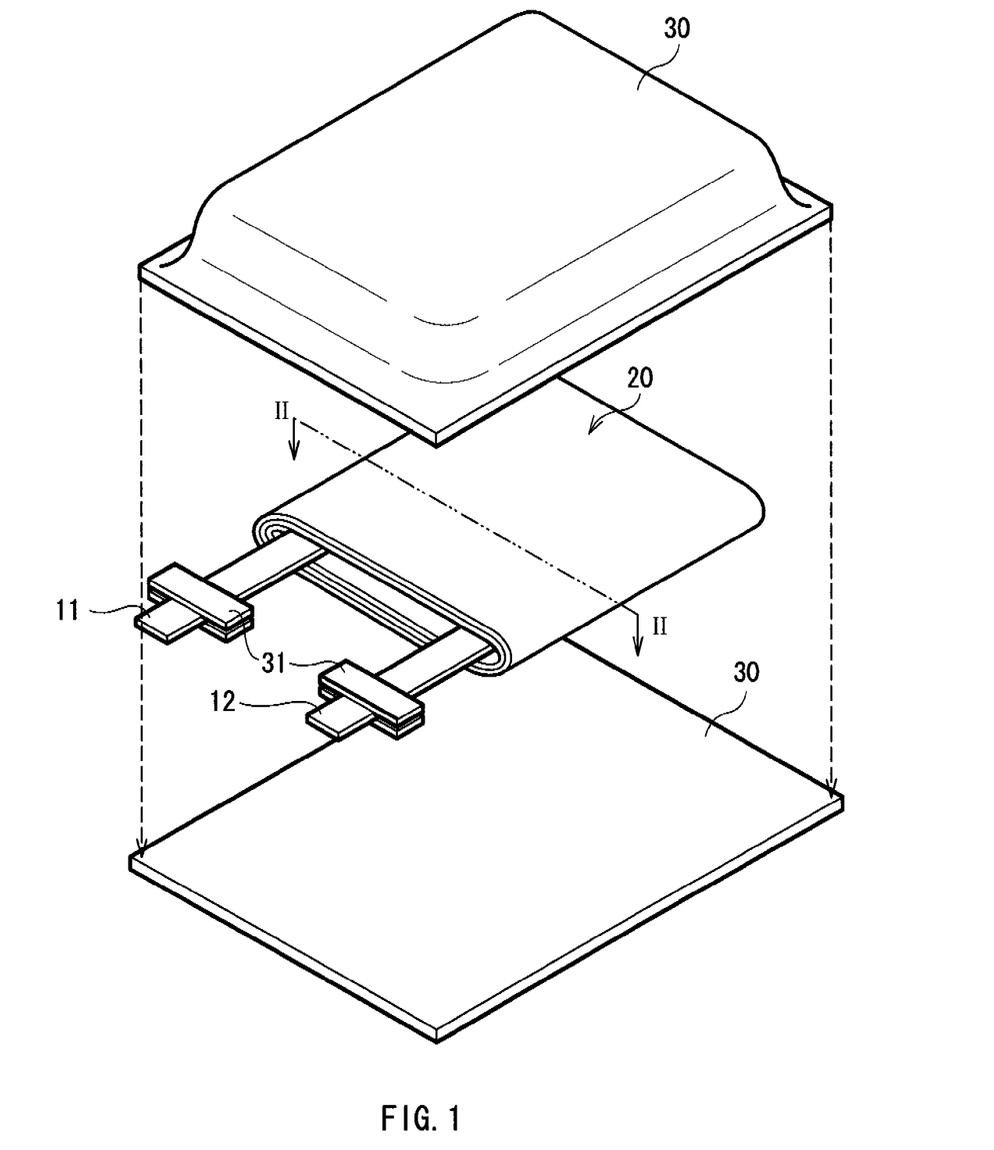
FIG. 1 is an exploded perspective view showing a structure of a battery according to an embodiment.
Figure 2:
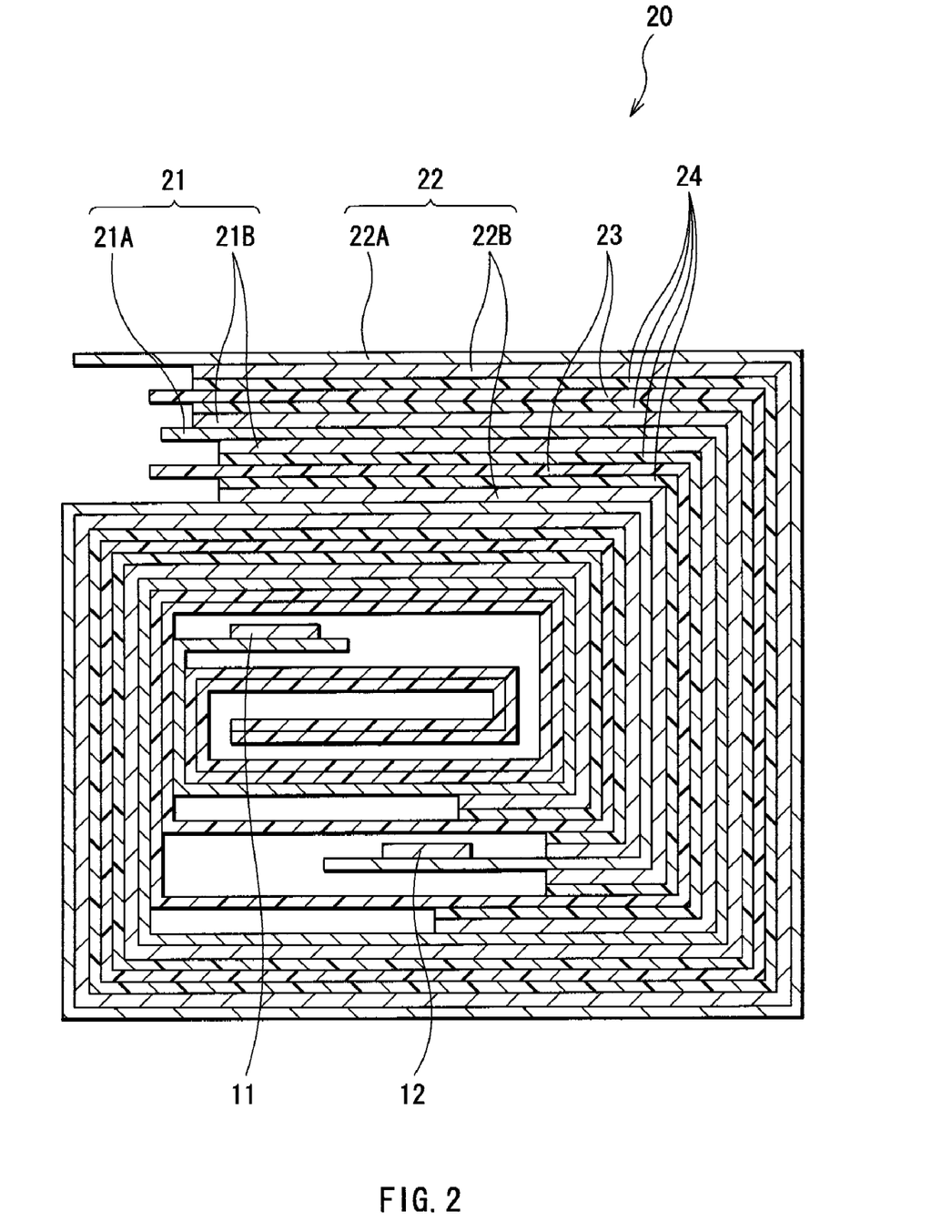
FIG. 2 is an enlarged cross section showing a structure taken along line II-II of a main section of the battery shown in FIG. 1.

First, a description will be given of a structure of a battery according to an embodiment. FIG. 1 shows an exploded perspective structure of the battery, and FIG. 2 shows an enlarged cross sectional structure taken along line II-II of a main section of the battery shown in FIG. 1. As shown in FIG. 1, the battery includes a spirally wound electrode body 20 to which a cathode lead 11 and an anode lead 12 are attached inside a film package member 30, and has a so-called laminated film type battery structure. The battery herein described is a so-called lithium ion secondary battery in which the anode capacity is expressed by the capacity component due to insertion and extraction of a light metal (for example, lithium).

The cathode lead 11 and the anode lead 12 are, for example, derived in the same direction from inside to outside of the package member 30. The cathode lead 11 is made of, for example, a metal material such as aluminum (Al). The anode lead 12 is made of, for example, a metal material such as copper (Cu), nickel (Ni), and stainless. The cathode lead 11 and the anode lead 12 respectively have the structure in a state of a thin plate or mesh.

The package member 30 is formed of an aluminum laminated film in which, for example, a nylon film, an aluminum foil, and a polyethylene film are bonded together in this order. The package member 30 has a structure, for example, as follows. The respective outer edge portions of two rectangular aluminum laminated films are contacted to each other by fusion bonding or an adhesive, so that the polyethylene film faces the spirally wound electrode body 20.

An adhesive film 31 to protect from entering of outside air is inserted between the package member 30 and the cathode lead 11/the anode lead 12. The adhesive film 31 is made of a material having contact characteristics to the cathode lead 11 and the anode lead 12. As such a material, for example, a polyolefin resin such as polyethylene, polypropylene, modified polyethylene, and modified polypropylene can be cited.

The package member 30 may be made of a laminated film having other lamination structure, a polymer film such as polypropylene, or a metal film, instead of the foregoing aluminum laminated film.

In the spirally wound electrode body 20, as shown in FIG. 2, a cathode 21 and an anode 22 are layered with a separator 23 and an electrolyte 24 in between and then spirally wound.

In the cathode 21, for example, a cathode active material layer 21B is provided on the both faces of a cathode current collector 21A having a pair of opposed faces. The cathode current collector 21A is made of, for example, a metal material such as aluminum. The cathode active material layer 21B contains, for example, a cathode active material and a cathode binder, and may contain an electrical conductor or the like. As the electrical conductor, for example, a carbon material such as graphite and acetylene black can be cited.

The cathode active material contains one or more cathode materials capable of inserting and extracting lithium as an electrode reactant. As a cathode material, for example, a complex oxide containing lithium can be cited. More specifically, as a complex oxide of lithium and a transition metal, lithium cobalt oxide, lithium nickel oxide, or a solid solution containing these compounds ($Li(Ni_xCo_yMn_z)O_2$: the values of x, y, and z are respectively in the range of $0<x<1$, $0<y<1$, $0<z<1$, and $x+y+z=1$); lithium manganese oxide ($LiMn_2O_4$) having a spinel structure or a solid solution thereof ($Li(Mn_{2-v}Ni_v)O_4$: the value of v is in the range of $v<2$) and the like can be cited. In addition, as the cathode material, for example, a phosphoric acid compound having an olivine structure such as lithium iron phosphate ($LiFePO_4$) can be cited. Thereby, a high energy density can be obtained. In addition to the foregoing, the cathode material may be, for example, an oxide such as titanium oxide, vanadium oxide, and manganese dioxide; a disulfide such as iron disulfide, titanium disulfide, and molybdenum sulfide; sulfur; or a conductive polymer such as polyaniline and polythiophene.

The cathode binder contains a polymer containing vinylidene fluoride as a component. By containing vinylidene fluoride as a component as the electrolyte 24, the contact characteristics of the electrolyte 24 to the cathode 21 are improved. The polymer may be a homo polymer (polyvinylidene fluoride), or a copolymer containing vinylidene fluoride as a component. The content of the cathode binder in the cathode active material layer 21B is not particularly limited, but for example, in the range from 1 wt % to 10 wt %. The content is preferably small when the weight average molecular weight of the polymer composing the cathode binder is large. Meanwhile, the content is preferably large when the weight average molecular weight of the polymer composing the cathode binder is small. The binder may contain other one or more polymers or copolymers together with the foregoing polymer containing vinylidene fluoride as a component.

In the anode 22, for example, an anode active material layer 22B is provided on the both faces of an anode current collector 22A having a pair of opposed faces. The anode current collector 22A is made of, for example, a metal material such as copper, nickel, and stainless. The anode active material layer 22B contains, for example, an anode active material and an anode binder, and may further contain an electrical conductor (for example, a carbon material) or the like if necessary.

The anode active material layer contains one or more anode materials capable of inserting and extracting lithium. As the anode material, for example, a carbon material such as graphite, non-graphitizable carbon, and graphitizable carbon can be cited. As a graphite type, for example, artificial graphite and natural graphite such as mesophase carbon microbead, carbon fiber, and coke can be cited. The carbon material is preferably used, since a change in the crystal structure due to insertion and extraction of lithium is extremely small and the carbon material functions as an electrical conductor as well.

Further, as the anode material, for example, a material containing at least one of metal elements and metalloid elements as an element capable of forming an alloy with lithium can be cited. Such a material is preferably used, since a high energy density can be thereby obtained. Such an anode material may be a simple substance, an alloy, or a compound of a metal element or a metalloid element, or may have one or more phases thereof at least in part. In the application, alloys include an alloy containing one or more metal elements and one or more metalloid elements, in addition to an alloy including two or more metal elements. It is needless to say that an alloy may contain nonmetallic elements. The texture thereof includes a solid solution, a eutectic crystal (eutectic mixture), an intermetallic compound, and a texture in which two or more thereof coexist.

As a material containing at least one of a metal element and a metalloid element as an element, for example, a material containing silicon or tin can be cited. Silicon and tin have the high ability to insert and extract lithium, and thus can provide a high energy density. Such a material may be used singly, or a plurality of such materials may be used by mixing.

As a specific example of such a material, a material containing tin as the first element, and in addition, the second and the third elements is preferable. Specially, a material containing tin, cobalt, and carbon as an element (CoSnC material) is preferable. Thereby, a higher energy density can be obtained, and superior cycle characteristics can be obtained. The CoSnC-containing material may further contain other element if necessary. Thereby, the battery capacity and the cycle characteristics can be more improved.

As a specific example of the foregoing material, a simple substance, an alloy, or a compound of tin; or a simple substance, an alloy, or a compound of silicon can be cited. In this case, for example, the anode active material layer 22B is preferably formed by using one of vapor-phase deposition method, liquid-phase deposition method, spraying method and firing method, or by using two or more methods thereof. The anode active material layer 22B is preferably alloyed with the anode current collector 22A at least in part of the interface therebetween. Thereby, the anode active material layer 22B is hardly destroyed resulting from expansion and shrinkage due to charge and discharge, and the electron conductivity between the anode current collector 22A and the anode active material layer 22B is improved. As vapor-phase deposition method, for example, physical deposition method or chemical deposition method can be used. More specifically, vacuum deposition method, sputtering method, ion plating method, laser ablation method, thermal CVD (Chemical Vapor Deposition) method, plasma CVD method and the like can be cited. As liquid-phase deposition method, known techniques such as electrolytic plating and electroless plating can be used. The firing method is a method in which a particulate anode active material is mixed with a binder or the like, the mixture is dispersed in a solvent, the anode current collector is coated with the resultant, and then the resultant is provided with heat treatment at a temperature higher than the meting point of the anode binder or the like. For firing method, a known technique can be used. For example, atmosphere firing method, reactive firing method, or hot press firing method can be cited.

The anode binder contains a binary system copolymer containing vinylidene fluoride and monomethylmaleic acid ester as a component. In particular, the copolymerization amount of monomethylmaleic acid ester in the binary system copolymer is in the range from 0.3 wt % to 2 wt %, and preferably in the range from 0.4 wt % to 2 wt %. When vinylidene fluoride is contained as a component as in the case of the electrolyte 24, the contact characteristics of the electrolyte 24 to the anode 22 is improved. Meanwhile, when monomethylmaleic acid ester is contained as a component, the contact characteristics of the anode 22 to the electrolyte 24 becomes stable, and the contact characteristics of the anode active material layer 22B to the anode current collector 22A is improved. The content of the anode binder in the anode active material layer 22B is not particularly limited, but for example, in the range from 2 wt % to 10 wt %. The anode binder may contain other one or more polymers or copolymers together with the foregoing binary system copolymer.

In the secondary battery, the charge capacity of the anode active material is larger than the charge capacity of the cathode active material. Thereby, the magnitude relation of the charge capacity between the cathode 21 and the anode 22 is adjusted so that the lithium metal is not precipitated on the anode 22 even when fully charged.

The separator 23 separates the cathode 21 from the anode 22, and lets through lithium ions while preventing current short circuit resulting from contact of the electrodes. The separator 23 is formed from, for example, a porous film made of a synthetic resin such as polytetrafluoroethylene, polypropylene, and polyethylene, or a porous film made of ceramics. The separator 23 may have a structure in which two or more of the foregoing porous films are layered.

The electrolyte 24 is a so-called gel electrolyte containing an electrolytic solution and a polymer compound holding the electrolytic solution. The gel electrolyte is preferable, since a high ion conductivity (for example, 1 mS/cm or more at room temperatures) can be thereby obtained, and leakage of the electrolytic solution can be thereby prevented. The electrolyte 24 is provided, for example, between the cathode 21 and the separator 23; and between the anode 22 and the separator 23.

The polymer compound contains a ternary system copolymer containing vinylidene fluoride, hexafluoropropylene, and monomethylmaleic acid ester as a component. In particular, the copolymerization amount of hexafluoropropylene in the ternary system copolymer is in the range from 4 wt % to 7.5 wt %, and preferably in the range from 5 wt % to 7 wt %. The copolymerization amount of monomethylmaleic acid ester in the ternary system copolymer is in the range from 0.3 wt % to 2 wt %, and preferably in the range from 0.4 wt % to 1.8 wt %. Due to the combination and the composition of these three components, the liquid retaining characteristics of the electrolyte 24 are improved. In the result, the contact characteristics of the electrolyte 24 to the cathode 21, the anode 22, and the separator 23 are improved. Thereby, a superior battery capacity, superior cycle characteristics, and superior load characteristics are obtained. More particularly, when the copolymerization amount is smaller than the foregoing lower limit, the state (gel state) of the electrolyte 24 becomes unstable resulting from lowering of the liquid retaining characteristics. In the result, the battery capacity is lowered, and the cycle characteristics and the load characteristics are lowered resulting from precipitation of the lithium metal in charge and discharge. Meanwhile, when the copolymerization amount is larger than the foregoing upper limit, the electrolyte 24 is not gelated and becomes in a state of thick polymer solution. In the result, the contact characteristics of the electrolyte 24 are lowered, and thus the cycle characteristics and the load characteristics are lowered. The copolymerization amount of vinylidene fluoride in the ternary system copolymer can be set as appropriate according to the copolymerization amounts of hexafluoropropylene and monomethylmaleic acid ester.

The weight average molecular weight of the ternary system copolymer is in the range from 0.6 million to 1.5 million, and preferably in the range from 0.7 million to 1.4 million. Thereby, the liquid retaining characteristics of the electrolyte 24 are improved, and the contact characteristics of the electrolyte 24 to the cathode 21, the anode 22, and the separator 23 are improved. More particularly, when the weight average molecular weight is smaller than 0.6 million, the electrolyte 24 is not gelated and becomes in a state of sharbet, and thus the liquid retaining characteristics are lowered. Meanwhile, when the weight average molecular weight is larger than 1.5 million, the viscosity of the electrolyte 24 becomes excessively high, and thus the contact characteristics are lowered.

Though the content of the polymer compound in the electrolyte 24 varies according to, for example, the compatibility therebetween and the molecular weight of the polymer compound, the content of the polymer compound in the electrolyte 24 is in the range from 6 wt % to 20 wt %, and preferably in the range from 8 wt % to 12 wt %. When the content is excessively small, the retention characteristics of the electrolytic solution as a gel may be insufficient. Meanwhile, when the content is excessively large, the volume of the liquid portion in the electrolyte 24 becomes decreased, and thus the ion conductivity may be lowered.

The polymer compound may contain, for example, other one or more polymers and copolymers together with the foregoing ternary system copolymer.

The electrolytic solution contains a solvent and an electrolyte salt.

The solvent contains, for example, an organic solvent. As the organic solvent, for example, ethylene carbonate, propylene carbonate, butylene carbonate, 1,3-dioxole-2-one, dimethyl carbonate, ethyl methyl carbonate, diethyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methyoxypropionitrile, N,N-dimethylformamide, N-methylpyrrolidinone, N-methyloxazolidinone, N,N'-dimethylimidazolidinone, nitromethane, nitroethane, sulfolane, dimethyl sulfoxide phosphate or the like can be cited. Thereby, a superior battery capacity, superior cycle characteristics, and superior load characteristics can be obtained. Such a solvent may be used singly, or one or more thereof may be used by mixing. Specially, it is preferable to use two or more solvents selected from the group consisting of ethylene carbonate, propylene carbonate, dimethyl carbonate, ethyl methyl carbonate, and diethyl carbonate. Thereby, the dissociation property of the electrolyte salt and the ionic mobility are improved, and thus higher effects can be obtained. As a combination of the solvents in this case, for example, a binary system mixed solvent composed of ethylene carbonate and propylene carbonate; a ternary system mixed solvent composed of ethylene carbonate, propylene carbonate, and ethyl methyl carbonate; a five-component system mixed solvent composed of ethylene carbonate, propylene carbonate, ethyl methyl carbonate, dimethyl carbonate, and diethyl carbonate or the like can be cited. The solvent may contain fluorinated ester carbonate typified by fluorinated ethylene carbonate and fluorinated propylene carbonate.

The electrolyte salt includes a light metal salt such as lithium salt. As the lithium salt, for example, lithium hexafluorophosphate (LiPF6), lithium tetrafluoroborate (LiBF4), lithium perchlorate (LiClO4), lithium hexafluoroarsenate (LiAsF6), lithium tetraphenyl borate (LiB(C6H5)4), lithium methanesulfonate (LiCH3SO3), lithium trifluoromethanesulfonate (LiCF3SO3), lithium tetrachloroaluminate (LiAlCl4), lithium hexafluorosilicate (Li2SiF6), lithium chloride (LiCl), lithium bromide (LiBr), lithium bis(trifluoromethanesulfonyl)imide (LiN(CF3SO2)2), lithium bis(pentafluoroethanesulfonyl)imide (LiN(C2F5SO2)2), lithium 1,2-perfluoroethanedisulfonylimide, lithium 1,3-perfluoropropanedisulfonylimide, lithium tris(trifluoromethanesulfonyl)methide (LiC(CF3SO2)3) or the like can be cited. Thereby, a superior battery capacity, superior cycle characteristics, and superior load characteristics can be obtained. Such a lithium salt may be used singly, or one or more thereof may be used by mixing. Specially, it is preferable that the electrolyte salt includes at least one selected from the group consisting of lithium hexafluorophosphate, lithium tetrafluoroborate, lithium bis(trifluoromethanesulfonyl)imide, and lithium bis(pentafluoroethanesulfonyl)imide. Thereby, the internal resistance is decreased, and thus higher effects can be obtained.

The concentration of the electrolyte salt in the electrolytic solution is in the range from 0.8 mol/kg to 1.7 mol/kg, and more preferably in the range from 0.85 wt % to 1.6 wt %. Thereby, the number of ions related to electric charge transport is secured, and thus a superior battery capacity can be obtained. More specifically, when the concentration is lower than 0.8 mol/kg, the absolute number of ions related to electric charge transport becomes small, and the ion conductivity becomes lowered. In the result, an overvoltage is applied to the interface between the cathode active material layer 21B/the anode active material layer 22B and the electrolyte 24, and thereby side reaction becomes large. Meanwhile, when the concentration is higher than 1.7 mol/kg, the dissociation property of the electrolyte salt are lowered, and thus the number of ions substantially related to the electric charge transport becomes small. In addition, since the electrolyte salt is increased and the viscosity of the electrolytic solution is increased, the ionic mobility is lowered and thus the ion conductivity is lowered. Further, interaction between the electrolyte salt and the solvent becomes larger than interaction between the polymer compound and the solvent. Therefore, the liquid retaining characteristics of the gel electrolyte 24 are lowered. For the following reason, the concentration of the electrolyte salt is preferably 1.7 mol/kg or less. That is, the electrolyte salt is reacted to moisture to generate hydrogen fluoride (HF). Such a phenomenon is affected by the moisture amount, the salt concentration, the temperatures and the like. Generated hydrogen fluoride causes adverse effects such as gas generation and corrosion due to acid. When the salt concentration is high, the generation amount of hydrogen fluoride becomes large. Therefore, to prevent adverse effects on the battery characteristics resulting from generation of hydrogen fluoride, the upper limit of the salt concentration is preferably 1.7 mol/kg.

The secondary battery can be, for example, manufactured in the following procedure.

First, a precursor solution (sol) containing an electrolytic solution, a polymer compound, and a diluent solvent is prepared. The cathode 21 and the anode 22 are coated with the precursor solution, and then the diluent solvent is volatilized. Thereby, the electrolyte 24 as a gel electrolyte is formed. Subsequently, the cathode lead 11 and the anode lead 12 are respectively attached to the cathode current collector 21A and the anode current collector 22A. Subsequently, the cathode 21 and the anode 22 on which the electrolyte 24 is formed are layered with the separator 23 in between. After that, the lamination is spirally wound in the longitudinal direction, and thereby the spirally wound electrode body 20 is formed. Subsequently, for example, the spirally wound electrode body 20 is sandwiched between the 2 pieces of film package members 30, and then outer edge portions of the package members 30 are contacted by thermal fusion bonding or the like to enclose the spirally wound electrode body 20. At this time, the adhesive film 31 is inserted between the cathode lead 11/the anode lead 12 and the package member 30. Thereby, the secondary battery shown in FIG. 1 and FIG. 2 is completed.

In the secondary battery, when charged, for example, lithium ions are extracted from the cathode 21, and inserted in the anode 22 through the electrolyte 24. Meanwhile, when discharged, for example, lithium ions are extracted from the anode 22, and are inserted in the cathode 21 through the electrolyte 24.

In the secondary battery, the following actions can be obtained based on the kind and the composition of the polymer compound, the concentration of the electrolyte salt, the type of the cathode binder, and the type and the composition of the anode binder.

Firstly, the polymer compound in the electrolyte 24 contains the ternary system copolymer containing vinylidene fluoride, hexafluoropropylene, and monomethylmaleic acid ester as a component. The copolymerization amounts of hexafluoropropylene and monomethylmaleic acid ester in the ternary system copolymer are respectively in the range from 4 wt % to 7.5 wt % and in the range from 0.3 wt % to 2 wt %. Therefore, compared to the case that the copolymerization amounts do not satisfy the foregoing ranges, the state (gel state) of the electrolyte 24 becomes stable even when the concentration of the electrolyte salt is increased. Thereby, the liquid retaining characteristics of the electrolyte 24 are improved. Consequently, the contact characteristics of the electrolyte 24 to the cathode 21, the anode 22, and the separator 23 are improved.

Secondary, the weight average molecular weight of the foregoing ternary system copolymer is in the range from 0.6 million to 1.5 million. Therefore, compared to the case that the weight average molecular weight does not satisfy the foregoing range, the state (gel state) of the electrolyte 24 becomes stable.

Thirdly, the concentration of the electrolyte salt in the electrolytic solution is in the range from 0.8 mol/kg to 1.7 mol/kg. Therefore, compared to the case that the concentration of the electrolyte salt in the electrolytic solution does not satisfy the foregoing range, the number of ions related to electric charge transport is secured.

Fourthly, when the polymer compound in the electrolyte 24 contains the ternary system copolymer containing vinylidene fluoride as a component, since the cathode binder in the cathode 21 contains the polymer containing vinylidene fluoride as a component, the contact characteristics of the electrolyte 24 to the cathode 21 are improved compared to the case that the cathode binder does not contain the polymer containing vinylidene fluoride as a component.

In this case, the anode binder in the anode 22 contains a binary system copolymer containing vinylidene fluoride and monomethylmaleic acid ester as a component. The copolymerization amount of monomethylmaleic acid ester in the binary system copolymer is in the range from 0.3 wt % to 2 wt %. Therefore, compared to the case that the anode binder does not contain the foregoing binary system copolymer, or compared to the case that the anode binder contains the foregoing binary system copolymer but the copolymerization amount of monomethylmaleic acid ester does not satisfy the foregoing range, the contact characteristics of the electrolyte 24 to the anode 22 are improved, and the contact characteristics become stable.

According to the secondary battery, as described above, even when the concentration of the electrolyte salt is high, the liquid retaining characteristics of the electrolyte 24 are improved. Therefore, the contact characteristics of the electrolyte 24 to the cathode 21, the anode 22, and the separator 24 are improved. Thereby, even when a defect such as a break exists in the film package member 30, the electrolytic solution is hardly leaked. Consequently, the battery capacity, the cycle characteristics, and the load characteristics are improved, and thus superior battery characteristics can be obtained.

EXAMPLES

Further, examples of the application will be described in detail.

1. First, to examine the relation between the composition of the ternary system copolymer containing vinylidene fluoride (VDF), hexafluoropropylene (HFP), and monomethylmaleic acid ester (MMM) as a component (hereinafter simply referred to as "ternary system copolymer") and the battery performance, the following secondary batteries of Examples 1-1, 1-2, 2-1 to 2-3, and Comparative examples 1-1, 1-2, 2-1 to 2-3, and 3-1 to 3-8 were fabricated.

Example 1-1

The laminated film type secondary battery shown in FIG. 1 and FIG. 2 was fabricated in the following procedure. The secondary battery was fabricated as a lithium ion secondary battery in which the capacity of the anode 22 was expressed by the capacity component due to insertion and extraction of lithium.

First, the cathode 21 was formed. 92 parts by weight of lithium cobalt oxide (LiCoO2) powder as a cathode active material, 3 parts by weight of polyvinylidene fluoride (PVDF) powder as a binder, and 5 parts by weight of graphite powder as an electrical conductor were mixed. After that, the mixture was dispersed in N-methyl-2-pyrrolidone as a solvent to obtain paste cathode mixture slurry. Subsequently, the both faces of the cathode current collector 21A made of an aluminum foil were coated with the cathode mixture slurry, which was dried under a reduced pressure for 24 hours at 100 deg C. Subsequently, the resultant was compression-molded by a roll pressing machine to form a cathode sheet. After that, the cathode sheet was cut into a strip sized 50 mm×300 mm, and thereby the cathode active material layer 21B was formed. Finally, the cathode lead 11 made of aluminum was welded to one end of the cathode current collector 21A.

Next, the anode 22 was formed. 91 parts by weight of artificial graphite powder as an anode active material and 9 parts by weight of a binary system copolymer containing VDF and MMM as a component as a binder were mixed. After that, the mixture was dispersed in N-methyl-2-pyrrolidone as a solvent to obtain paste anode mixture slurry. The copolymerization amount of MMM in the binary system copolymer was 1 wt %. Subsequently, the both faces of the anode current collector 22A made of a copper foil were coated with the anode mixture slurry, which was dried under a reduced pressure for 24 hours at 120 deg C. Subsequently, the resultant was compression-molded by a roll pressing machine to form an anode sheet. After that, the anode sheet was cut into a strip sized 52 mm×320 mm, and thereby the anode active material layer 22B was formed. Finally, the anode lead 12 made of nickel was welded to one end of the anode current collector 22A.

Next, the electrolyte 24 was formed. As a solvent, ethylene carbonate (EC) and propylene carbonate (PC) were mixed at a weight ratio of 40:60. After that, lithium hexafluorophosphate as an electrolyte salt was dissolved therein so that the concentration of lithium hexafluorophosphate became 1.2 mol/kg to prepare an electrolytic solution. Subsequently, the electrolytic solution, the ternary system copolymer containing VDF, HFP, and MMM as a component as a polymer compound, and dimethyl carbonate as a diluent solvent were mixed to obtain a precursor solution. After that, the cathode 21 and the anode 22 were coated with the precursor solution, and the diluent solvent was dried. Thereby, the electrolyte 24 as a gel electrolyte was formed. Then, the copolymerization amounts of VDF, HFP, and MMM in the ternary system copolymer were respectively 94.5 wt %, 5 wt %, and 0.5 wt %, and the weight average molecular weight of the ternary system copolymer was 0.1 million.

Next, the cathode 21, the separator 23 made of a porous polyethylene film (thickness: 10 μm, width: 54 mm, porosity: 33%), and the anode 22 were layered in this order. After that, the resultant lamination was spirally wound many times in the longitudinal direction, and thereby the spirally wound electrode body 20 was formed.

Next, the spirally wound electrode body 20 was inserted between package members 30 made of two aluminum laminated films in which a nylon film, an aluminum foil, and a poly non-stretched ethylene film were bonded in this order. Subsequently, the outer edges of the package members 30 were thermally fusion-bonded and sealed under the reduced pressure environment. Thereby, the spirally wound electrode body 20 was contained so that the cathode lead 11 and the anode lead 12 were derived through the adhesive film 31 between the package members 30.

Finally, constant current and constant voltage charge was performed under the conditions that the charge current was 120 mA, the upper voltage was 4.2 V, and the charge time was 12 hours. Then, the batteries were left for 3 days in a state of being full charged. After that, constant capacity discharge was performed under the conditions that the discharge current was 120 mA and the discharge capacity was 400 mAh. Thereby, the secondary battery was completed.

Example 1-2

A procedure was performed in the same manner as that of Example 1-1, except that the copolymerization amounts of VDF, HFP, and MMM in the ternary system copolymer were respectively 92.5 wt %, 7 wt %, and 0.5 wt %.

Comparative Example 1-1

A procedure was performed in the same manner as that of Example 1-1, except that the copolymerization amounts of VDF, HFP, and MMM in the ternary system copolymer were respectively 96.5 wt %, 3 wt %, and 0.5 wt %.

Comparative Example 1-2

A procedure was performed in the same manner as that of Example 1-1, except that the copolymerization amounts of VDF, HFP, and MMM in the ternary system copolymer were respectively 91.5 wt %, 8 wt %, and 0.5 wt %.

Examples 2-1 to 2-3

A procedure was performed in the same manner as that of Example 1-1, except that the copolymerization amounts of VDF, HFP, and MMM in the ternary system copolymer were respectively 92.6 wt %, 7 wt %, and 0.4 wt %; were respectively 92.0 wt %, 7 wt %, and 1 wt %; and were respectively 91.2 wt %, 7 wt %, and 1.8 wt %.

Comparative Examples 2-1 to 2-3

A procedure was performed in the same manner as that of Example 1-1, except that the copolymerization amounts of VDF, HFP, and MMM in the ternary system copolymer were respectively 93.0 wt %, 7 wt %, and 0 wt %; were respectively 92.8 wt %, 7 wt %, and 0.2 wt %; and were respectively 90.8 wt %, 7 wt %, and 2.2 wt %.

Comparative Examples 3-1 to 3-8

A procedure was performed in the same manner as that of Example 1-1, except that the copolymerization amounts of VDF, HFP, and MMM in the ternary system copolymer were respectively 96.8 wt %, 3 wt %, and 0.2 wt %; were respectively 94.8 wt %, 5 wt %, and 0.2 wt %; were respectively 96.5 wt %, 3 wt %, and 0.5 wt %; were respectively 91.8 wt %, 8 wt %, and 0.2 wt %; were respectively 94.5 wt %, 3 wt %, and 2.5 wt %; were respectively 92.5 wt %, 5 wt %, and 2.5 wt %; were respectively 91.5 wt %, 8 wt %, and 0.5 wt %; and were respectively 89.5 wt %, 8 wt %, and 2.5 wt %.

As the battery performance of the secondary batteries of Examples 1-1, 1-2, and 2-1 to 2-3 and Comparative examples 1-1, 1-2, 2-1 to 2-3, and 3-1 to 3-8, the battery capacity, the cycle characteristics, and the load characteristics were examined. The results shown in Table 1 to Table 3 were obtained.

In examining the battery capacity, first, constant current and constant voltage charge was performed under the conditions that the charge current was 800 mA, the upper voltage was 4.2 V, and the charge time was 2.5 hours. After that, constant current discharge was performed under the conditions that the discharge current was 160 mA and the final voltage was 3 V. The electric charge obtained at that time was regarded as the battery capacity (mAh). Since the minimum guarantee capacity of the secondary battery was 800 mAh, the evaluation criterion of the battery capacity was 800 mAh or more.

In examining the cycle characteristics, charge and discharge were repeated according to the following procedure, and then the discharge capacity retention ratio was calculated. First, in the atmosphere of 23 deg C., charge, pause (3 minutes), discharge, and pause (3 minutes) were performed in this order. Thereby, the discharge capacity at the first cycle was obtained. Subsequently, in the same atmosphere, the foregoing charge and discharge were repeated until the total number of cycles reached 400. Thereby, the discharge capacity at the 400th cycle was obtained. Finally, the discharge capacity retention ratio (%)=(discharge capacity at the 400th cycle/discharge capacity at the first cycle)×100 was calculated. The evaluation criterion of the cycle characteristics was 80% or more. The charge conditions and the discharge conditions in each cycle were similar to those when the battery capacity was examined.

In examining the load characteristics, charge and discharge were performed according to the following procedure, and then the discharge capacity retention ratio was calculated. First, after charge, constant current discharge was performed under the conditions that the load current was 160 mA and the final voltage was 3 V. Thereby, the discharge capacity (discharge capacity in 160 mA discharge) was obtained. Subsequently, after charge was performed again, constant current discharge was performed under the condition that the load current was 2.4 A and the final voltage was 3 V, and thereby the discharge capacity (discharge capacity in 2.4 A discharge) was obtained. Finally, the discharge capacity retention ratio (%)=(discharge capacity in 2.4 A discharge/discharge capacity in 160 mA discharge)×100 was calculated. The evaluation criterion of the load characteristics was 80% or more similarly to in the cycle characteristics. The charge conditions were similar to those when the battery capacity was examined.

TABLE 1

| | Polymer compound | | | Weight | Electrolytic solution | | | | | | Discharge capacity retention ratio (%) | |
|---|---|---|---|---|---|---|---|---|---|---|---|---|
| | Copolymerization amount (wt %) | | | average molecular weight | | Electrolyte salt | | | | Battery capacity | | |
| | VDF | HFP | MMM | (million) | Solvent | Kind | Concentration (mol/kg) | Cathode | Anode | (mAh) | Cycle characteristics | Load characteristics |
| Example 1-1 | 94.5 | 5 | 0.5 | 100 | EC + PC | LiPF$_6$ | 1.2 | PVDF | VDF + MMM | 850 | 86 | 85 |
| Example 1-2 | 92.5 | 7 | 0.5 | | | | | | | 841 | 84 | 90 |
| Comparative example 1-1 | 96.5 | 3 | 0.5 | 100 | EC + PC | LiPF$_6$ | 1.2 | PVDF | VDF + MMM | 748 | 66 | 58 |
| Comparative example 1-2 | 91.5 | 8 | 0.5 | | | | | | | 795 | 68 | 85 |

TABLE 2

| | Polymer compound | | | Weight | Electrolytic solution | | | | | | Discharge capacity retention ratio (%) | |
|---|---|---|---|---|---|---|---|---|---|---|---|---|
| | Copolymerization amount (wt %) | | | average molecular weight | | Electrolyte salt | | | | Battery capacity | | |
| | VDF | HFP | MMM | (million) | Solvent | Kind | Concentration (mol/kg) | Cathode | Anode | (mAh) | Cycle characteristics | Load characteristics |
| Example 2-1 | 92.6 | 7 | 0.4 | 100 | EC + PC | LiPF$_6$ | 1.2 | PVDF | VDF + MMM | 846 | 85 | 90 |
| Example 2-2 | 92.0 | 7 | 1 | | | | | | | 811 | 83 | 92 |
| Example 2-3 | 91.2 | 7 | 1.8 | | | | | | | 811 | 83 | 92 |
| Comparative example 2-1 | 93.0 | 7 | 0 | 100 | EC + PC | LiPF$_6$ | 1.2 | PVDF | VDF + MMM | 741 | 64 | 62 |
| Comparative example 2-2 | 92.8 | 7 | 0.2 | | | | | | | 733 | 69 | 58 |
| Comparative example 2-3 | 90.8 | 7 | 2.2 | | | | | | | 795 | 73 | 89 |

TABLE 3

| | Polymer compound | | | Weight average molecular weight (million) | Electrolytic solution | | | | | Battery capacity (mAh) | Discharge capacity retention ratio (%) | |
| | Copolymerization amount (wt %) | | | | | Electrolyte salt | | | | | | |
| | | | | | Solvent | Kind | Concentration (mol/kg) | Cathode | Anode | | Cycle characteristics | Load characteristics |
| | VDF | HFP | MMM | | | | | | | | | |
|---|---|---|---|---|---|---|---|---|---|---|---|---|
| Comparative example 3-1 | 96.8 | 3 | 0.2 | 100 | EC + PC | LiPF$_6$ | 1.2 | PVDF | VDF + MMM | 738 | 66 | 62 |
| Comparative example 3-2 | 94.8 | 5 | 0.2 | | | | | | | 758 | 73 | 65 |
| Comparative example 3-3 | 96.5 | 3 | 0.5 | | | | | | | 753 | 72 | 66 |
| Comparative example 3-4 | 91.8 | 8 | 0.2 | | | | | | | 790 | 70 | 74 |
| Comparative example 3-5 | 94.5 | 3 | 2.5 | | | | | | | 777 | 73 | 77 |
| Comparative example 3-6 | 92.5 | 5 | 2.5 | | | | | | | 781 | 69 | 82 |
| Comparative example 3-7 | 91.5 | 8 | 0.5 | | | | | | | 769 | 74 | 84 |
| Comparative example 3-8 | 89.5 | 8 | 2.5 | | | | | | | 795 | 75 | 88 |

As shown in Table 1, when the copolymerization amount of HFP was changed while the copolymerization amount of MMM was fixed to the constant value (0.5 wt %) in the ternary system copolymer, both the battery capacity and the discharge capacity retention ratio (cycle characteristics and load characteristics) showed a tendency to be increased and then decreased, that is, the both of them were changed in a mountain-like curve, as the copolymerization amount of HFP was increased. In this case, the battery capacity and the discharge capacity retention ratio did not satisfy the evaluation criterion (800 mAh or more, 80% or more) in Comparative examples 1-1 and 1-2 in which the copolymerization amount of HFP was 3 wt % and 8 wt %. However, the battery capacity and the discharge capacity retention ratio satisfied the evaluation criterion in Examples 1-1 and 1-2 in which the copolymerization amount of HFP was 5 wt % and 7 wt %. As described above, both the battery capacity and the discharge capacity retention ratio were changed in a mountain-like curve. When the thresholds in which the battery capacity and the discharge capacity retention ratio satisfied the evaluation criterion (the lower limit and the upper limit of the copolymerization amount of HFP) were examined, the lower limit and the upper limit thereof were respectively 4 wt % and 7.5 wt %.

As shown in Table 2, when the copolymerization amount of MMM was changed while the copolymerization amount of HFP was fixed to the constant value (7 wt %) in the ternary system copolymer, both the battery capacity and the discharge capacity retention ratio were changed in a mountain-like curve, as the copolymerization amount of MMM was increased. In this case, the battery capacity and the discharge capacity retention ratio did not satisfy the evaluation criterion in Comparative examples 2-1 to 2-3 in which the copolymerization amount of MMM was 0 wt %, 0.2 wt %, and 2.2 wt %. However, the battery capacity and the discharge capacity retention ratio satisfied the evaluation criterion in Examples 2-1 to 2-3 in which the copolymerization amount of MMM was 0.4 wt %, 1 wt %, and 1.8 wt %. When the thresholds in which the battery capacity and the discharge capacity retention ratio satisfied the evaluation criterion (the lower limit and the upper limit of the copolymerization amount of MMM) were examined, the lower limit and the upper limit thereof were respectively 0.3 wt % and 2 wt %.

In the result, it was confirmed that when the battery capacity and the discharge capacity retention ratio satisfied the evaluation criterion in the secondary battery in which the polymer compound contained the ternary system copolymer, the copolymerization amount of HFP in the ternary system copolymer was in the range from 4 wt % to 7.5 wt % and preferably in the range from 5 wt % to 7 wt %; and the copolymerization amount of MMM in the ternary system copolymer was in the range from 0.3 wt % to 2 wt %, and preferably in the range from 0.4 wt % to 1.8 wt %.

Table 3 ensures the foregoing explanation. That is, in Comparative examples 3-1 to 3-8 in which both the copolymerization amounts of HFP and MMM in the ternary system copolymer did not satisfy the foregoing range condition, the battery capacity and the discharge capacity retention ratio did not satisfy the evaluation criterion. Therefore, it was confirmed that to improve the battery performance of the secondary battery in which the polymer compound contained the ternary system copolymer, the copolymerization amounts of the HFP and MMM should satisfy the foregoing range conditions.

2. Next, to examine the relation between the weight average molecular weight of the ternary system copolymer and the battery performance in the secondary battery in which the polymer compound contained the ternary system copolymer, the following secondary batteries of Examples 4-1 to 4-3 and Comparative examples 4-1 and 4-2 were fabricated.

Examples 4-1 to 4-3

A procedure was performed in the same manner as that of Example 1-2, except that the weight average molecular weights of the ternary system copolymer were respectively 0.7 million, 1.2 million, and 1.4 million.

Comparative Examples 4-1 and 4-2

A procedure was performed in the same manner as that of Example 1-2, except that the weight average molecular weights of the ternary system copolymer were respectively 0.5 million and 1.6 million.

For the secondary batteries of Examples 4-1 to 4-3 and Comparative examples 4-1 and 4-2, the battery performance were examined in the same manner as that explained for Table 1 to Table 3. The results shown in Table 4 were obtained. In Table 4, the battery performance of Example 1-2 in which the weight average molecular weight of the ternary system copolymer was 1 million was shown together.

ternary system copolymer was in the range from 0.6 million to 1.5 million, and preferably in the range from 0.7 million to 1.4 million, the battery capacity and the discharge capacity retention ratio satisfied the evaluation criterion in the secondary battery in which the polymer compound contains the ternary system copolymer.

3. Next, to examine the relation between the concentration of the electrolyte salt and the battery performance in the secondary battery in which the polymer compound contained the ternary system copolymer, the following secondary batteries of Examples 5-1 and 5-2 and Comparative examples 5-1 and 5-2 were fabricated.

TABLE 4

| | Polymer compound | | | | Electrolytic solution | | | | | | Discharge capacity retention ratio (%) | |
|---|---|---|---|---|---|---|---|---|---|---|---|---|
| | Copolymerization amount (wt %) | | | Weight average molecular weight (million) | | Electrolyte salt | | | | Battery capacity (mAh) | | |
| | VDF | HFP | MMM | | Solvent | Kind | Concentration (mol/kg) | Cathode | Anode | | Cycle characteristics | Load characteristics |
| Example 4-1 | 92.5 | 7 | 0.5 | 70 | EC + PC | LiPF$_6$ | 1.2 | PVDF | VDF + MMM | 822 | 82 | 82 |
| Example 1-2 | | | | 100 | | | | | | 841 | 84 | 90 |
| Example 4-2 | | | | 120 | | | | | | 842 | 84 | 86 |
| Example 4-3 | | | | 140 | | | | | | 838 | 82 | 84 |
| Comparative example 4-1 | 92.5 | 7 | 0.5 | 50 | EC + PC | LiPF$_6$ | 1.2 | PVDF | VDF + MMM | 755 | 73 | 76 |
| Comparative example 4-2 | | | | 160 | | | | | | 780 | 65 | 78 |

As shown in Table 4, as the weight average molecular weight becomes larger, both the battery capacity and the discharge capacity retention ratio (cycle characteristics and load characteristics) were changed in a mountain-like curve. In this case, the battery capacity and the discharge capacity retention ratio did not satisfy the evaluation criterion (800 mAh or more, 80% or more) in Comparative examples 4-1 and 4-2 in which the weight average molecular weight was 0.5 million and 1.6 million. However, the battery capacity and the discharge capacity retention ratio satisfied the evaluation criterion in Examples 4-1, 1-2, 4-2, and 4-3 in which the weight average molecular weight was 0.7 million, 1 million, 1.2 million, and 1.4 million. When the thresholds in which the battery capacity and the discharge capacity retention ratio satisfied the evaluation criterion (the lower limit and the upper limit of the weight average molecular weight) were examined, the lower limit and the upper limit thereof were respectively 0.6 million and 1.5 million. Consequently, it was confirmed that when the weight average molecular weight of the Examples 5-1 and 5-2

A procedure was performed in the same manner as that of Example 1-2, except that the concentrations of the electrolyte salt were respectively 0.85 mol/kg and 1.6 mol/kg.

Comparative Examples 5-1 and 5-2

A procedure was performed in the same manner as that of Example 1-2, except that the concentrations of the electrolyte salt were respectively 0.75 mol/kg and 1.8 mol/kg.

For the secondary batteries of Examples 5-1 and 5-2 and Comparative examples 5-1 and 5-2, the battery performance was examined in the same manner as that explained for Table 1 to Table 3. The results shown in Table 5 were obtained. In Table 5, the battery performance of Example 1-2 in which the concentration of the electrolyte salt was 1.2 mol was shown together.

TABLE 5

| | Polymer compound | | | Weight average molecular weight (million) | Electrolytic solution | | | | | Discharge capacity retention ratio (%) | |
|---|---|---|---|---|---|---|---|---|---|---|---|---|
| | Copolymerization amount (wt %) | | | | | Electrolyte salt | | | Battery capacity (mAh) | Cycle characteristics | Load characteristics |
| | VDF | HFP | MMM | | Solvent | Kind | Concentration (mol/kg) | Cathode | Anode | | | |
| Example 5-1 | 92.5 | 7 | 0.5 | 100 | EC + PC | LiPF$_6$ | 0.85 | PVDF | VDF + MMM | 805 | 82 | 82 |
| Example 1-2 | | | | | | | 1.2 | | | 841 | 84 | 90 |
| Example 5-2 | | | | | | | 1.6 | | | 862 | 83 | 83 |
| Comparative example 5-1 | 92.5 | 7 | 0.5 | 100 | EC + PC | LiPF$_6$ | 0.75 | PVDF | VDF + MMM | 743 | 63 | 77 |
| Comparative example 5-2 | | | | | | | 1.8 | | | 874 | 68 | 70 |

As shown in Table 5, as the concentration of the electrolyte salt becomes larger, the battery capacity was gradually increased. Meanwhile, as the concentration of the electrolyte salt becomes larger, the discharge capacity retention ratio (cycle characteristics and load characteristics) was changed in a mountain-like curve. In this case, the battery capacity and the discharge capacity retention ratio did not satisfy the evaluation criterion (800 mAh or more, 80% or more) in Comparative examples 5-1 and 5-2 in which the concentrations of the electrolyte salt were respectively 0.75 mol/kg and 1.8 mol/kg. However, the battery capacity and the discharge capacity retention ratio satisfied the evaluation criterion in Examples 5-1, 1-2, and 5-2 in which the concentrations of the electrolyte salt were respectively 0.85 mol/kg, 1.2 mol/kg, and 1.6 mol/kg. When the thresholds in which the battery capacity and the discharge capacity retention ratio satisfied the evaluation criterion (the lower limit and the upper limit of the concentration of the electrolyte salt) were examined, the lower limit and the upper limit thereof were respectively 0.8 mol/kg and 1.7 mol/kg. Consequently, it was confirmed that when the concentration of the electrolyte salt was in the range from 0.8 mol/kg to 1.7 mol/kg, and more preferably in the range from 0.85 wt % to 1.6 mol/kg, the battery capacity and the discharge capacity retention ratio satisfied the evaluation criterion in the secondary battery in which the polymer compound contains the ternary system copolymer.

4. Next, to examine the relation between the cathode binder type/anode binder type and the battery performance in the secondary battery in which the polymer compound contained the ternary system copolymer, the following secondary batteries of Examples 6-1 to 6-6 and Comparative examples 6-1 to 6-19 were fabricated.

Examples 6-1 to 6-3

A procedure was performed in the same manner as that of Example 1-2, except that the copolymerization amount of MMM in the anode binder was 0.4 wt %, and the concentrations of the electrolyte salt were respectively 0.85 mol/kg, 1.2 mol/kg, and 1.6 mol/kg.

Examples 6-4 to 6-6

A procedure was performed in the same manner as that of Example 1-2, except that the copolymerization amount of MMM in the anode binder was 2 wt %, and the concentrations of the electrolyte salt were respectively 0.85 mol/kg, 1.2 mol/kg, and 1.6 mol/kg.

Comparative Examples 6-1 and 6-2

A procedure was performed in the same manner as that of Example 1-2, except that the copolymerization amount of MMM in the anode binder was 0.4 wt %, and the concentrations of the electrolyte salt were respectively 0.75 mol/kg and 1.8 mol/kg.

Comparative Examples 6-3 and 6-4

A procedure was performed in the same manner as that of Example 1-2, except that the copolymerization amount of MMM in the anode binder was 2 wt %, and the concentrations of the electrolyte salt were respectively 0.75 mol/kg and 1.8 mol/kg.

Comparative Examples 6-5 to 6-9

A procedure was performed in the same manner as that of Example 1-2, except that polytetrafluoroethylene (PTFE) was used as a cathode binder, and the concentrations of the electrolyte salt were respectively 0.75 mol/kg, 0.85 mol/kg, 1.2 mol/kg, 1.6 mol/kg, and 1.8 mol/kg.

Comparative Examples 6-10 to 6-14

A procedure was performed in the same manner as that of Example 1-2, except that styrene-butadiene rubber (SBR) and water were respectively used as an anode binder and a dispersion solvent, and the concentrations of the electrolyte salt were respectively 0.75 mol/kg, 0.85 mol/kg, 1.2 mol/kg, 1.6 mol/kg, and 1.8 mol/kg.

Comparative Example 6-15 to 6-19

A procedure was performed in the same manner as that of Example 1-2, except that PVDF was used as an anode binder, and the concentrations of the electrolyte salt were respectively 0.75 mol/kg, 0.85 mol/kg, 1.2 mol/kg, 1.6 mol/kg, and 1.8 mol/kg.

For the secondary batteries of Examples 6-1 to 6-6 and Comparative examples 6-1 to 6-19, the battery performance was examined in the same manner as that explained for Table 1 to Table 3. The results shown in Table 6 and Table 7 were obtained. In Table 6, the battery performance of Example 1-2 in which the copolymerization amount of MMM in the anode binder was 1 wt % was shown together.

TABLE 6

| | Polymer compound | | | | Electrolytic solution | | | |
|---|---|---|---|---|---|---|---|---|
| | Copolymerization amount (wt %) | | | Weight average molecular weight (million) | | Electrolyte salt | | |
| | VDF | HFP | MMM | | Solvent | Kind | Concentration (mol/kg) | Cathode |
| Example 6-1 | 92.5 | 7 | 0.5 | 100 | EC + PC | LiPF$_6$ | 0.85 | PVDF |
| Example 6-2 | | | | | | | 1.2 | |
| Example 6-3 | | | | | | | 1.6 | |
| Example 1-2 | 92.5 | 7 | 0.5 | 100 | EC + PC | LiPF$_6$ | 1.2 | PVDF |
| Example 6-4 | 92.5 | 7 | 0.5 | 100 | EC + PC | LiPF$_6$ | 0.85 | PVDF |
| Example 6-5 | | | | | | | 1.2 | |
| Example 6-6 | | | | | | | 1.6 | |
| Comparative example 6-1 | 92.5 | 7 | 0.5 | 100 | EC + PC | LiPF$_6$ | 0.75 | PVDF |
| Comparative example 6-2 | | | | | | | 1.8 | |
| Comparative example 6-3 | 92.5 | 7 | 0.5 | 100 | EC + PC | LiPF$_6$ | 0.75 | PVDF |
| Comparative example 6-4 | | | | | | | 1.8 | |

| | Anode | | Battery capacity (mAh) | Discharge capacity retention Ratio (%) | |
|---|---|---|---|---|---|
| | Kind | MMM copolymerization amount (wt %) | | Cycle characteristics | Load characteristics |
| Example 6-1 | VDF + MMM | 0.4 | 812 | 83 | 88 |
| Example 6-2 | | | 849 | 87 | 86 |
| Example 6-3 | | | 866 | 81 | 82 |
| Example 1-2 | VDF + MMM | 1 | 841 | 84 | 90 |
| Example 6-4 | VDF + MMM | 2 | 808 | 81 | 89 |
| Example 6-5 | | | 856 | 84 | 85 |
| Example 6-6 | | | 870 | 85 | 81 |
| Comparative example 6-1 | VDF + MMM | 0.4 | 762 | 66 | 77 |
| Comparative example 6-2 | | | 877 | 72 | 68 |
| Comparative example 6-3 | VDF + MMM | 2 | 764 | 67 | 76 |
| Comparative example 6-4 | | | 880 | 67 | 66 |

TABLE 7

| | Polymer compound | | | | Electrolytic solution | | | |
|---|---|---|---|---|---|---|---|---|
| | Copolymerization amount (wt %) | | | Weight average molecular weight (million) | | Electrolyte salt | | |
| | VDF | HFP | MMM | | Solvent | Kind | Concentration (mol/kg) | Cathode |
| Comparative example 6-5 | 92.5 | 7 | 0.5 | 100 | EC + PC | LiPF$_6$ | 0.75 | PTFE |
| Comparative example 6-6 | | | | | | | 0.85 | |
| Comparative example 6-7 | | | | | | | 1.2 | |
| Comparative example 6-8 | | | | | | | 1.6 | |
| Comparative example 6-9 | | | | | | | 1.8 | |
| Comparative example 6-10 | 92.5 | 7 | 0.5 | 100 | EC + PC | LiPF$_6$ | 0.75 | PVDF |

TABLE 7-continued

| | | | | | | | | |
|---|---|---|---|---|---|---|---|---|
| Comparative example 6-11 | | | | | | | 0.85 | |
| Comparative example 6-12 | | | | | | | 1.2 | |
| Comparative example 6-13 | | | | | | | 1.6 | |
| Comparative example 6-14 | | | | | | | 1.8 | |
| Comparative example 6-15 | 92.5 | 7 | 0.5 | 100 | EC + PC | LiPF$_6$ | 0.75 | PTFE |
| Comparative example 6-16 | | | | | | | 0.85 | |
| Comparative example 6-17 | | | | | | | 1.2 | |
| Comparative example 6-18 | | | | | | | 1.6 | |
| Comparative example 6-19 | | | | | | | 1.8 | |

| | Anode | | Battery capacity (mAh) | Discharge capacity retention Ratio (%) | |
|---|---|---|---|---|---|
| | Kind | MMM copolymerization amount (wt %) | | Cycle characteristics | Load characteristics |
| Comparative example 6-5 | VDF + MMM | 1 | 557 | 71 | 70 |
| Comparative example 6-6 | | | 612 | 73 | 75 |
| Comparative example 6-7 | | | 598 | 69 | 73 |
| Comparative example 6-8 | | | 575 | 62 | 65 |
| Comparative example 6-9 | | | 531 | 57 | 53 |
| Comparative example 6-10 | SBR | — | 485 | 29 | 43 |
| Comparative example 6-11 | | | 583 | 31 | 36 |
| Comparative example 6-12 | | | 605 | 25 | 51 |
| Comparative example 6-13 | | | 313 | 21 | 40 |
| Comparative example 6-14 | | | 211 | 18 | 32 |
| Comparative example 6-15 | PVDF | — | 713 | 32 | 61 |
| Comparative example 6-16 | | | 744 | 41 | 62 |
| Comparative example 6-17 | | | 732 | 44 | 69 |
| Comparative example 6-18 | | | 688 | 33 | 59 |
| Comparative example 6-19 | | | 613 | 29 | 44 |

As shown in Table 6 and Table 7, the battery capacity and the discharge capacity retention ratio (cycle characteristics and load characteristics) did not satisfy the evaluation criterion (800 mAh or more, 80% or more) in Comparative examples 6-5 to 6-9 in which the cathode binder was PTFE, regardless of the concentration of the electrolyte salt. However, the battery capacity and the discharge capacity retention ratio satisfied the evaluation criterion in Example 1-2 in which the cathode binder was PVDF, when the concentration of the electrolyte salt satisfied a specific range condition. The specific range condition of the concentration of the electrolyte salt was the appropriate range of the concentration of the electrolyte salt derived from the results of Table 5 (in the range from 0.8 mol/kg to 1.7 mol/kg, and more preferably in the range from 0.85 mol/kg to 1.6 mol/kg), as evidenced by comparison between Examples 6-1 to 6-3, 1-2, and 6-4 to 6-6 and Comparative examples 6-1 to 6-4.

Further, the battery capacity and the discharge capacity retention ratio did not satisfy the evaluation criterion in Comparative examples 6-10 to 6-19 in which the anode binder was SBR or PVDF, regardless of the concentration of the electrolyte salt. However, the battery capacity and the discharge capacity retention ratio satisfied the evaluation criterion in Examples 6-1 to 6-3, 1-2, and 6-4 to 6-6 in which the anode binder was the binary system copolymer containing VDF and MMM as a component, when the concentration of the electrolyte salt satisfied the foregoing specific range condition. In Examples 6-1 to 6-3, 1-2, and 6-4 to 6-6 in which the copolymerization amounts of MMM were respectively 0.4 wt %, 1 wt %, and 2 wt %, the battery capacity and the discharge capacity retention ratio satisfied the evaluation criterion. Therefore, when the thresholds in which the battery capacity and the discharge capacity retention ratio satisfied the evaluation criterion (the lower limit and the upper limit of the copolymerization amount of MMM) were examined, the lower limit and the upper limit thereof were respectively 0.3 wt % and 2 wt %.

Consequently, it was confirmed that when the cathode binder contained the polymer containing VDF as a component, the anode binder contained the binary system copolymer containing VDF and MMM as a component, and the copolymerization amount of MMM in the binary system copolymer was in the range from 0.3 wt % to 2 wt %, and preferably in the range from 0.4 wt % to 2 wt %, the battery capacity and the discharge capacity retention ratio satisfied the evaluation criterion in the secondary battery in which the polymer compound contained the ternary system copolymer.

From the results obtained in the foregoing Table 1 to Table 7, in the secondary battery in which the polymer compound contained the ternary system copolymer containing VDF, HFP, and MMM as a component, it was confirmed that when the following conditions were satisfied, the battery performance was improved: (1) the copolymerization amounts of HFP and MMM in the ternary system copolymer were respectively in the range from 4 wt % to 7.5 wt % and in the range from 0.3 wt % to 2 wt %, and the weight average molecular weight of the ternary system copolymer was in the range from 0.6 million to 1.5 million; (2) the concentration of the electrolyte salt was in the range from 0.8 mol/kg to 1.7 mol/kg; (3) the cathode binder contained the polymer containing VDF as a component; and (4) the anode binder contained the binary system copolymer containing VDF and MMM as a component and the copolymerization amount of MMM in the binary system copolymer was in the range from 0.3 wt % to 2 wt %.

5. Next, to examine the relation between the kind of electrolyte salt and the battery performance in the secondary battery in which the polymer compound contained the ternary system copolymer, the following secondary batteries of Examples 7-1 to 7-3 were fabricated.

Examples 7-1

A procedure was performed in the same manner as that of Example 1-2, except that a mixture of lithium hexafluorophosphate (concentration: 0.6 mol/kg) and lithium tetrafluoroborate (concentration: 0.6 mol/kg) was used as the electrolyte salt.

Examples 7-2

A procedure was performed in the same manner as that of Example 1-2, except that a mixture of lithium hexafluorophosphate (concentration: 0.6 mol/kg) and lithium bis(trifluoromethanesulfonyl)imide (concentration: 0.6 mol/kg) was used as the electrolyte salt.

Example 7-3

A procedure was performed in the same manner as that of Example 1-2, except that a mixture of lithium hexafluorophosphate (concentration: 0.6 mol/kg) and lithium bis(pentafluoroethanesulfonyl)imide (concentration: 0.6 mol/kg) was used as the electrolyte salt.

For the secondary batteries of Examples 7-1 to 7-3, the battery performance was examined in the same manner as that explained for Table 1 to Table 3. The results shown in Table 8 were obtained. In Table 8, the battery performance of Example 1-2 using lithium hexafluorophosphate (concentration: 1.2 mol/kg) as the electrolyte salt was shown together.

TABLE 8

| | Polymer compound | | | | Electrolytic solution | | |
|---|---|---|---|---|---|---|---|
| | Copolymerization amount (wt %) | | | Weight average molecular weight (million) | | Electrolyte salt | |
| | VDF | HFP | MMM | | Solvent | Kind | Concentration (mol/kg) |
| Example 1-2 | 92.5 | 7 | 0.5 | 100 | EC + PC | $LiPF_6$ | 1.2 |
| Example 7-1 | | | | | | $LiPF_6 + LiBF_4$ | 0.6 + 0.6 |
| Example 7-2 | | | | | | $LiPF_6 + LiN(CF_3SO_2)_2$ | |
| Example 7-3 | | | | | | $LiPF_6 + LiN(C_2F_5SO_2)_2$ | |

| | Cathode | Anode | Battery capacity (mAh) | Discharge capacity retention ratio (%) | |
|---|---|---|---|---|---|
| | | | | Cycle characteristics | Load characteristics |
| Example 1-2 | PVDF | VDF + MMM | 841 | 84 | 90 |
| Example 7-1 | | | 805 | 81 | 80 |
| Example 7-2 | | | 839 | 85 | 88 |
| Example 7-3 | | | 847 | 87 | 86 |

As shown in Table 8, the battery capacity and the discharge capacity retention ratio (cycle characteristics and load characteristics) satisfied the evaluation criterion (800 mAh or more, 80% or more) in Comparative example 7-1 in which the electrolyte salt was the mixture of lithium hexafluorophosphate and lithium tetrafluoroborate, in Example 7-2 in which the electrolyte salt was the mixture of lithium hexafluorophosphate and lithium bis(trifluoromethanesulfonyl)imide, and Example 7-3 in which the electrolyte salt was the mixture of lithium hexafluorophosphate and lithium bis(pentafluoroethanesulfonyl)imide in the same manner as in Example 1-1 in which the electrolyte salt was lithium hexafluorophosphate. Consequently, it was confirmed that in the secondary battery in which the polymer compound contained the ternary system copolymer, the battery performance was improved even when the electrolyte salt was the mixture containing lithium hexafluorophosphate.

6. Finally, to examine the relation between the kind of solvent and the battery performance in the secondary battery in which the polymer compound contained the ternary system copolymer, the following secondary batteries of Examples 8-1 and 8-2 were fabricated.

Example 8-1

A procedure was performed in the same manner as that of Example 1-2, except that a mixed solvent of EC, PC, and ethyl methyl carbonate (EMC) (EC:PC:EMC=45:45:10 at the weight ratio) was used as the solvent.

Example 8-2

A procedure was performed in the same manner as that of Example 1-2, except that a mixed solvent of EC, PC, EMC, dimethyl carbonate (DMC), and diethyl carbonate (DEC) (EC:PC:EMC:DMC:DEC=40:30:15:5:10 at the weight ratio) was used as the solvent.

For the secondary batteries of Examples 8-1 and 8-2, the battery performance was examined in the same manner as that explained for Table 1 to Table 3. The results shown in Table 9 were obtained. In Table 9, the battery performance of Example 1-2 using the mixed solvent of EC and PC as the solvent was shown together.

which the solvent was the mixed solvent of EC, PC, EMC, DMC, and DEC, in the same manner as in Example 1-2 in which the solvent was the mixed solvent of EC and PC. Consequently, it was confirmed that in the secondary battery in which the polymer compound contained the ternary system copolymer, the battery performance was improved even when the solvent was the mixture containing EC and PC.

The application has been described with reference to the embodiment and the examples. However, the application is not limited to the aspects explained in the foregoing embodiment and the foregoing examples, and various modifications may be made. Specifically, while in the foregoing embodiment and the foregoing examples, the description has been given of the lithium ion secondary battery in which the anode capacity is expressed by the capacity component due to insertion and extraction of lithium, the application is not limited thereto. For example, the battery of the application can be applied to the secondary battery in which the anode capacity includes the capacity component due to insertion and extraction of lithium and the capacity component due to precipitation and dissolution of lithium, and is expressed by the sum of these capacity components, by setting the charge capacity of the anode active material smaller than the charge capacity of the cathode active material.

Further, in the foregoing embodiment and the foregoing examples, the description has been given of the case using lithium as an electrode reactant. However, the application may be also applied to the case using other element of Group 1A such as sodium (Na) and potassium (K); an element of Group 2A such as magnesium and calcium (Ca); or other light metal such as aluminum. In this case, as the anode active

TABLE 9

| | Polymer compound | | | | | | |
|---|---|---|---|---|---|---|---|
| | Copolymerization amount (wt %) | | | Weight average molecular weight (million) | Electrolytic solution | | |
| | | | | | | Electrolyte salt | |
| | VDF | HFP | MMM | | Solvent | Kind | Concentration (mol/kg) |
| Example 1-2 | 92.5 | 7 | 0.5 | 100 | EC + PC | $LiPF_6$ | 1.2 |
| Example 8-1 | | | | | EC + PC + EMC | | |
| Example 8-2 | | | | | EC + PC + DMC + EMC + DEC | | |

| | | | Battery capacity (mAh) | Discharge capacity retention ratio (%) | |
|---|---|---|---|---|---|
| | Cathode | Anode | | Cycle characteristics | Load characteristics |
| Example 1-2 | PVDF | VDF + MMM | 841 | 84 | 90 |
| Example 8-1 | | | 842 | 88 | 93 |
| Example 8-2 | | | 839 | 90 | 95 |

As shown in Table 9, the battery capacity and the discharge capacity retention ratio (cycle characteristics and load characteristics) satisfied the evaluation criterion (800 mAh or more, 80% or more) in Example 8-1 in which the solvent was the mixed solvent of EC, PC, and EMC and Example 8-2 in material, the anode material described in the foregoing embodiment may be used as well.

Further, in the foregoing embodiment and the foregoing examples, the description has been given of the laminated film type secondary battery as a battery structure of the battery according to the application as an example. However, the application can be also applied to the secondary battery having other battery structure such as a cylindrical battery, a coin type battery, a button type battery, and a square type battery. Further, in the foregoing embodiment and the foregoing examples, the description has been given of the spirally wound electrode body obtained by layering the cathode and the anode and then spirally winding the resultant lamination. However, the application may be similarly applied to a lamination type electrode body in which a cathode and an anode are layered, or an electrode body in which a cathode and an anode are layered and then the resultant lamination is not spirally wound but is bent several times. It is needless to say that the application can be applied not only to the secondary battery, but also to other battery such as a primary battery.

In the foregoing embodiment and the foregoing examples, the description has been given of the appropriate range derived from the results of the examples for the copolymerization amounts of hexafluoropropylene and monomethylmaleic acid ester in the ternary system copolymer. Such a description does not totally deny a possibility that each copolymerization amount could be out of the foregoing range. That is, the foregoing appropriate range is only a particularly preferable range to obtain effects of the application, and each copolymerization amount may be slightly out of the foregoing range as long as the effects of the application can be thereby obtained. The same is applied to the appropriate ranges of the weight average molecular weight of the ternary system copolymer, the concentration of the electrolyte salt, and the copolymerization amount of monomethylmaleic acid ester in the anode binder.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising a cathode, an anode, and an electrolyte, wherein:
the electrolyte contains an electrolytic solution and a polymer compound that contains a ternary system copolymer containing vinylidene fluoride, hexafluoropropylene, and monomethylmaleic acid ester as a component,
copolymerization amounts of the hexafluoropropylene and the monomethylmaleic acid ester in the ternary system copolymer are respectively in a range from 4 wt % to 7.5 wt %, and in a range from 0.3 wt % to 2 wt %, and a weight average molecular weight of the ternary system copolymer is in a range from 0.6 million to 1.5 million;
the electrolytic solution contains a solvent and an electrolyte salt,
a concentration of the electrolyte salt in the electrolytic solution is in a range from 0.8 mol/kg to 1.7 mol/kg;
the cathode contains a cathode active material and a cathode binder that contains a polymer containing vinylidene fluoride as a component; and
the anode contains an anode active material and an anode binder that contains a binary system copolymer containing vinylidene fluoride and monomethylmaleic acid ester as a component, and
a copolymerization amount of the monomethylmaleic acid ester in the binary system copolymer is in a range from 0.3 wt % to 2 wt %.

2. The battery according to claim 1, wherein the solvent includes two or more elements selected from the group consisting of ethylene carbonate, propylene carbonate, dimethyl carbonate, ethyl methyl carbonate, and diethyl carbonate.

3. The battery according to claim 1, wherein the electrolyte salt includes at least one selected from the group consisting of lithium hexafluorophosphate, lithium tetrafluoroborate, lithium bis(trifluoromethanesulfonyl)imide, and lithium bis(pentafluoroethanesulfonyl)imide.

4. The battery according to claim 1, wherein the cathode active material can insert and extract lithium, and contains a complex oxide containing lithium.

5. The battery according to claim 1, wherein the anode active material can insert and extract lithium, and contains a carbon material or a material containing at least one of a metal element and a metalloid element capable of forming an alloy with lithium as an element.

6. The battery according to claim 1, wherein the cathode, the anode, and the electrolyte are contained inside a film-shaped package member.

* * * * *